US012694340B2

(12) United States Patent
Miller et al.

(10) Patent No.: US 12,694,340 B2
(45) Date of Patent: Jul. 28, 2026

(54) MACHINE-LEARNING TECHNIQUES FOR PREDICTING UNOBSERVABLE OUTPUTS

(71) Applicant: EQUIFAX INC., Atlanta, GA (US)

(72) Inventors: Stephen Miller, Guiseley (GB); Lewis Jordan, Atlanta, GA (US); Felipe Alfonso Avila Rosales, Cumming, GA (US); Terry Woodford, Kennesaw, GA (US); Matthew Turner, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 535 days.

(21) Appl. No.: 18/446,246

(22) Filed: Aug. 8, 2023

(65) Prior Publication Data

US 2025/0053859 A1     Feb. 13, 2025

(51) Int. Cl.
*G06N 20/00* (2019.01)
(52) U.S. Cl.
CPC .................................. *G06N 20/00* (2019.01)
(58) Field of Classification Search
CPC ........ G06N 20/00; G06N 3/09; G06N 3/0985; G06N 5/01; G06N 20/20; G06N 3/048; G06F 2209/501; G06F 9/5027
See application file for complete search history.

(56) References Cited

U.S. PATENT DOCUMENTS 9,294,497 B1 *   3/2016   Ben-Or ............... H04L 63/1433
10,607,039 B1 *  3/2020   Kinderman ............ G05B 17/02
11,010,196 B2 *  5/2021   Maiya Belur ......... G06F 9/5077
11,354,597 B1 *  6/2022   Cardoso ................. G06N 20/00
11,494,587 B1 *  11/2022  Ganesan ............. G06F 18/2148
11,630,996 B1 *  4/2023   O'Shea ................ G06N 3/0455
                                                        706/25
11,676,183 B1 *  6/2023   Andrews ................ G06N 3/045
                                                        705/7.39
11,816,539 B1 *  11/2023  Granson .................. G06N 5/01
12,346,850 B1 *  7/2025   Bhatnager ........ G06Q 10/06311
(Continued)

OTHER PUBLICATIONS

Lu et al., "Probabilistic Load Forecasting with a Non-Crossing Sparse-group Lasso-quantile Regression Deep Neural Network", Energy, vol. 242, No. 122955, Mar. 1, 2022.
(Continued)

*Primary Examiner* — Aravind K Moorthy
(74) *Attorney, Agent, or Firm* — Kilpatrick Townsend & Stockton LLP

(57)              ABSTRACT

In some aspects, a computing system can generate and optimize a machine learning model to estimate an unobservable capacity of a target system or entity. The computing system can access training vectors which include training predictor variables, training performance indicators, and task quantities. A training performance indicator indicating performance outcome corresponding to the predictor variables and a task quantity associated with a task assigned to the target entity that leads to the training performance indicator. The machine learning model can be trained by performing adjustments of parameters of the machine learning model to minimize a loss function defined based on the training vectors. The trained machine learning model can be used to estimate the capacity of the target system or entity for handling tasks and be used in assigning tasks to the target entity according to the determined capacity.

20 Claims, 6 Drawing Sheets

(56) References Cited

U.S. PATENT DOCUMENTS

| | | | | |
|---|---|---|---|---|
| 2002/0194326 | A1* | 12/2002 | Gold | G06F 11/008 709/224 |
| 2016/0314481 | A1* | 10/2016 | Hwang | G01R 22/063 |
| 2018/0034966 | A1 | 2/2018 | Te Booij et al. | |
| 2018/0107920 | A1* | 4/2018 | Jayaraman | G06N 20/00 |
| 2019/0132203 | A1* | 5/2019 | Wince | H04L 41/0816 |
| 2019/0158628 | A1* | 5/2019 | Fu | G06N 3/105 |
| 2019/0266501 | A1* | 8/2019 | Tavares | G06N 5/04 |
| 2020/0125469 | A1* | 4/2020 | Savolainen | G06F 9/3891 |
| 2020/0242489 | A1* | 7/2020 | Hama | G06F 3/14 |
| 2021/0050117 | A1* | 2/2021 | Ogallo | G16H 70/20 |
| 2021/0057919 | A1* | 2/2021 | Subbotin | H02J 7/90 |
| 2021/0173719 | A1* | 6/2021 | Chester | G06F 9/455 |
| 2021/0342197 | A1* | 11/2021 | Srinivasan | G06F 9/505 |
| 2021/0405521 | A1* | 12/2021 | Kim | G03F 1/36 |
| 2022/0044174 | A1* | 2/2022 | Kumar | G06Q 10/06313 |
| 2022/0147865 | A1* | 5/2022 | Naidoo | G06F 16/58 |
| 2022/0164744 | A1* | 5/2022 | Zhang | G06Q 10/06315 |
| 2022/0289166 | A1* | 9/2022 | Ohta | B60W 20/13 |
| 2022/0309595 | A1* | 9/2022 | England | G06Q 10/06315 |
| 2022/0351023 | A1 | 11/2022 | Shinde et al. | |
| 2022/0375567 | A1* | 11/2022 | Hosoi | G16H 20/30 |
| 2023/0044379 | A1* | 2/2023 | Barnea | G06Q 40/04 |
| 2023/0105438 | A1* | 4/2023 | Park | G06F 30/398 703/14 |
| 2023/0185799 | A1* | 6/2023 | Hoang | G06F 40/30 704/2 |
| 2023/0229738 | A1* | 7/2023 | Cleere | G06N 20/20 706/12 |
| 2023/0266768 | A1* | 8/2023 | Li | G01S 7/40 701/98 |
| 2023/0267731 | A1* | 8/2023 | Shang | G01N 33/12 382/110 |
| 2023/0281172 | A1* | 9/2023 | Kurian | H04L 67/104 707/673 |
| 2023/0315532 | A1* | 10/2023 | Hoffmann | G06F 9/505 718/104 |
| 2023/0351435 | A1* | 11/2023 | Wright | G06N 3/088 |
| 2023/0360088 | A1* | 11/2023 | Steede | G06Q 30/0255 |
| 2023/0401005 | A1* | 12/2023 | Muthiah | G06F 3/0688 |
| 2024/0025235 | A1* | 1/2024 | Morrison | B60H 1/3205 |
| 2024/0029867 | A1* | 1/2024 | Planche | H04N 13/189 |
| 2024/0095604 | A1* | 3/2024 | Zogaj | G06N 3/045 |
| 2024/0112437 | A1* | 4/2024 | Ikeda | G06V 10/25 |
| 2024/0119470 | A1* | 4/2024 | Paul | G06Q 30/0202 |
| 2024/0129801 | A1* | 4/2024 | Zaifman | H04W 28/0967 |
| 2024/0169293 | A1* | 5/2024 | Gray | G06Q 10/0635 |
| 2024/0185974 | A1* | 6/2024 | Tamboli | G16H 20/10 |
| 2024/0221164 | A1* | 7/2024 | Chen | G06V 10/771 |
| 2024/0230189 | A1* | 7/2024 | Moradian | F25B 49/00 |
| 2024/0259872 | A1* | 8/2024 | Yang | H04L 1/08 |
| 2024/0411891 | A1* | 12/2024 | Lange | G06F 21/577 |

OTHER PUBLICATIONS

International Application No. PCT/US2024/036496 , International Search Report and Written Opinion, Mailed on Oct. 29, 2024, 13 pages.

Yin et al., "Quantile Extreme Gradient Boosting for Uncertainty Quantification", Available online at: https://arxiv.org/pdf/2304.11732, Apr. 23, 2023, pp. 1-15.

Groeneboom, et al., "Current Status Linear Regression", The Annals of Statistics, vol. 46, No. 4, Aug. 2018, pp. 1415-1444.

Kobayashi, "Bayesian Endogenous Tobit Quantile Regression", Bayesian Analysis, vol. 12, No. 1, 2017, pp. 161-191.

Ou, et al., "Quantile Regression Models for Current Status Data", Journal of Statistical Planning and Inference, vol. 178, Nov. 2016, pp. 112-127.

Van Der Laan, et al., "Locally Efficient Estimation with Current Status Data and Time-Dependent Covariates", Journal of the American Statistical Association, vol. 93, No. 442, Jun. 1998, pp. 693-701.

* cited by examiner

MACHINE-LEARNING TECHNIQUES FOR PREDICTING UNOBSERVABLE OUTPUTS

TECHNICAL FIELD

The present disclosure relates generally to machine learning and artificial intelligence. More specifically, but not by way of limitation, this disclosure relates to using machine learning models for emulating intelligence that are trained for predicting unobservable outputs such as the capacity of an entity or a system for handling tasks.

BACKGROUND

Machine learning models, such as artificial neural networks, can be used to perform one or more functions, such as acquiring, processing, analyzing, and understanding various inputs in order to produce an output that includes numerical or symbolic information. Machine learning models are typically trained to produce an output that is observable, such as the correct or wrong classifications, the number of system failures within a day, and so on. However, it is often useful, but difficult, to use a machine learning model to predict an output that is not observable, such as the capacity of a system or an entity for handling tasks (e.g., computing tasks, storage tasks, etc.).

SUMMARY

Various aspects of the present disclosure provide systems and methods for predicting unobservable capacity using machine learning models. In one example, a method includes determining, using a machine learning model trained using a training process and from predictor variables associated with a target entity, a capacity of the target entity for handling tasks. The training process comprises accessing training vectors having elements representing training predictor variables, training performance indicators, and task quantities. A particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator. The training process further comprises performing adjustments of parameters of the machine learning model to minimize a loss function of the machine learning model. The loss function is defined based on the training predictor variables, the training performance indicators, and the task quantities. The method further includes transmitting, to a remote computing device, a responsive message including at least the determined capacity for use in assigning tasks to the target entity with task quantities according to the determined capacity.

In another example, a system includes a processing device; and a memory device in which instructions executable by the processing device are stored for causing the processing device to perform operations including determining, using a machine learning model trained using a training process and from predictor variables associated with a target entity, a capacity of the target entity for handling tasks. The training process comprises accessing training vectors having elements representing training predictor variables, training performance indicators, and task quantities and performing adjustments of parameters of the machine learning model to minimize a loss function of the machine learning model. A particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator. The loss function is defined based on the training predictor variables, the training performance indicators, and the task quantities. The operations further include transmitting, to a remote computing device, a responsive message including at least the determined capacity for use in assigning tasks to the target entity with task quantities according to the determined capacity.

In yet another example, a non-transitory computer-readable storage medium has program code that is executable by a processor device to cause a computing device to perform operations. The operations include determining, using a machine learning model trained using a training process and from predictor variables associated with a target entity, a capacity of the target entity for handling tasks. The training process comprises accessing training vectors having elements representing training predictor variables, training performance indicators, and task quantities and performing adjustments of parameters of the machine learning model to minimize a loss function of the machine learning model. A particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator. The loss function is defined based on the training predictor variables, the training performance indicators, and the task quantities. The operations further include transmitting, to a remote computing device, a responsive message including at least the determined capacity for use in assigning tasks to the target entity with task quantities according to the determined capacity.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
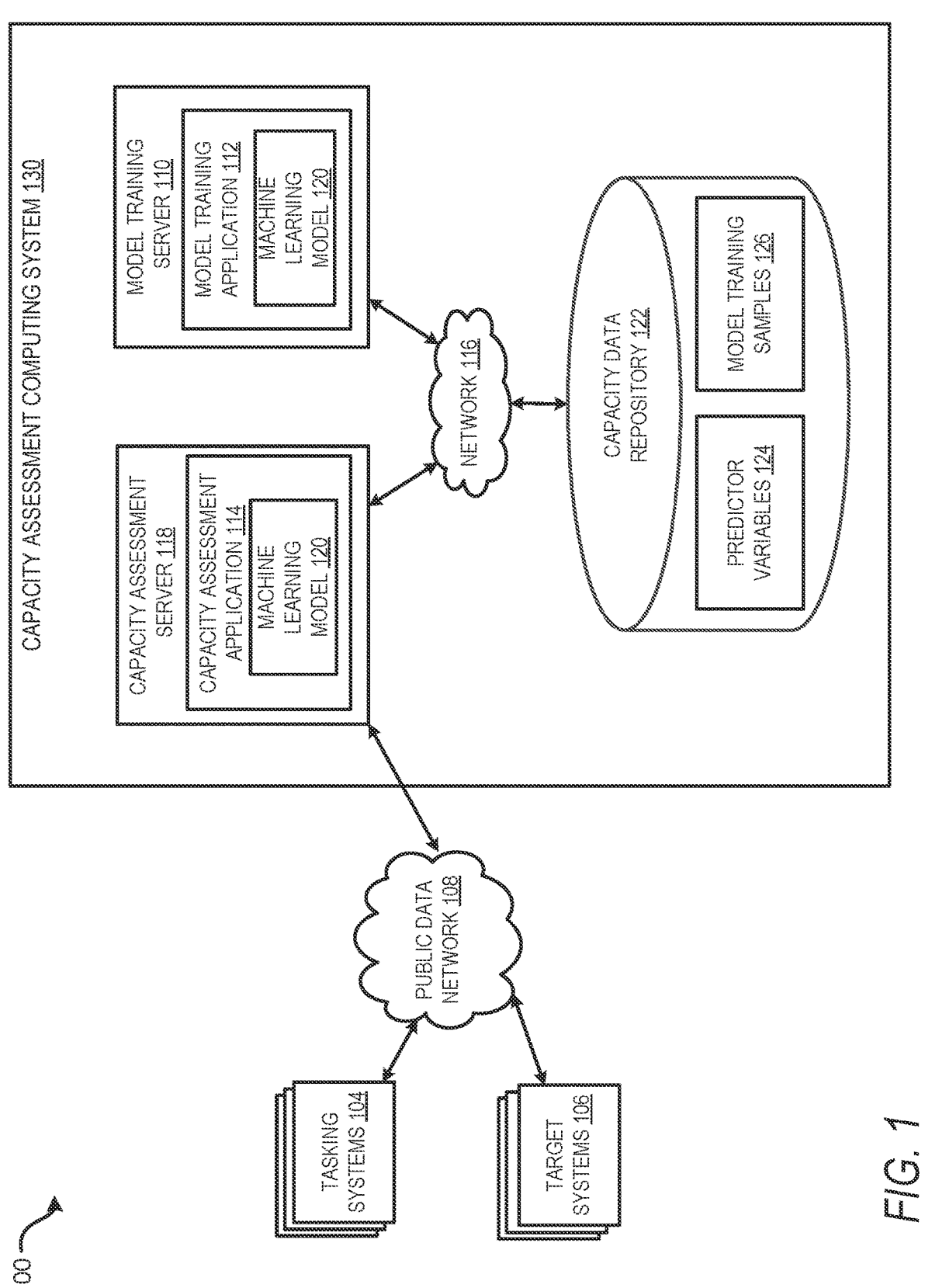
FIG. 1 is a block diagram depicting an example of a computing environment in which a machine learning model can be trained and applied in a capacity assessment application to predict unobservable capacity of a system or an entity, according to certain aspects of the present disclosure.

Certain aspects and features of the present disclosure relate to predicting unobservable capacity of a target system or entity using machine learning models. A system or an entity typically has a limited capacity for handling tasks. For example, a computing server may be able to process a maximum number of computing tasks simultaneously without causing a system failure. Such a maximum number of computing tasks can be used to measure the capacity of the system. Assigning more tasks than the capacity of the computing server will cause system failure. Assigning fewer tasks than the capacity will lead to resource waste because the system could have handled more tasks. As such, accurately estimating the capacity of a system or an entity can ensure that a proper number of tasks to be assigned or submitted to the target system or entity without causing a failure nor a waste of the resource. However, the capacity of a system or an entity is often unobservable. Therefore, the existing approaches to assessing the capacity of a system or an entity are based on rules, such as by comparing the stated hardware configuration of the system with an expected number of tasks typically submitted to the system. These rule-based approaches are not accurate and do not consider the dynamic nature of the system or entity.

Predicting unobservable capacity using machine learning models described herein solves the above problem. For example, training samples can be obtained for training a machine learning model to predict unobservable capacity of a target entity or a target system (which may be collectively referred to as a "target entity" or "entity"). The training samples can include elements representing training predictor variables, training performance indicators, and task quantities. The training predictor variables can include various variables associated with entities that can be used to estimate the capacity of the entity; the task quantity is the quantity of task assigned to the target entity; and the training performance indicator indicates the performance outcome corresponding to the predictor variables and the task quantity, such as whether there is any failure associated with the entity after the quantity of task is assigned to the entity. In some examples, the training performance indicator indicates the overall performance outcome of the entity, including the performance outcome on the assigned task and other tasks.

To train the model, a loss function can be established based on the training variables, the training performance indicators, and the task quantities. Because the capacity is not observable, the loss function cannot be defined as the difference between the actual capacity and the estimated capacity. Rather, the loss function can be defined to include a first type of penalty term based on a deficit amount of capacity estimation and a second type of penalty term based on an excess amount of capacity estimation. The deficit amount and the excess amount can be determined based on the difference between the model output generated by the machine learning model from the training predictor variables and the task quantity corresponding to the training predictor variables. By minimizing the loss function, and thus the combination of the two penalties, the machine learning model can be trained to provide an estimate of the capacity of the target entity.

In some examples, the loss function is defined as a piece-wise linear combination of the two types of penalties. In other examples, the loss function is defined as a case 1 interval censored quantile regression loss function based on the two types of penalties with a sigmoid approximation, referred to herein as a "quantile loss". As a result, the loss function can be minimized using a gradient decent optimization process. For this reason, the machine learning model can be any model that can be trained using the gradient decent optimization process, such as a neural network model, a gradient boosting machine (GBM) model, or an extreme gradient boosting (XGBoost) model. These models can also be suitably constrained to ensure explainability.

With the trained machine learning model, capacity assessment can be provided for target entities. For example, a tasking system (e.g., a system configured to assign or submit tasks to a target entity) can generate and submit a capacity assessment query for the target entity to a capacity assessment server. The capacity assessment server can perform capacity assessment using the trained machine learning model by inputting the predictor variables associated with the target entity and return the estimated capacity of the target entity to the tasking system. Based on the estimated capacity, the tasking system can determine the quantity of the tasks to be assigned or submitted to the target entity and assign the tasks to the target entity regularly.

Certain aspects described herein provide improvements to machine learning techniques to allow a machine learning model to predict an unobservable output. For instance, by constructing the loss function of the machine learning model based on a deficit amount of capacity estimation and an excess amount of capacity estimation, the training can achieve a balancing effect of both good and bad outcomes cases and allow the machine learning model estimations for unobservable capacity of a target entity. Further, because the machine learning model is trained based on various attributes or predictor variables associated with the target entity, the machine learning model-based capacity estimation is more accurate than the rule-based approach which only consider a limited number of attributes of the target entity. In addition, the complex interconnection between components of the machine learning model, such as the connections between nodes at different layers of a neural network, can better capture the relationship between the predictor variables and the capacity of the target entity, thereby enabling a more accurate estimation than the rule-based approaches.

The accurate estimation of the capacity of the target entity can improve the overall system performance. Because the capacity of the target entities or systems can be estimated more accurately, more tasks can be submitted or assigned to the target entities or systems at a given time period without causing failures or errors, thereby allowing the resources associated with the target entities or systems to be utilized more efficiently. As a result, the tasks can be completed faster saving the overall execution time.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Machine-Learning Operations

Referring now to the drawings, FIG. 1 is a block diagram depicting an example of an operating environment 100 in which a machine learning model can be trained and applied in a capacity assessment application to predict unobservable capacity of a system or entity. FIG. 1 depicts examples of hardware components of a capacity assessment computing system 130, according to some aspects. The capacity assessment computing system 130 is a specialized computing system that may be used for processing large amounts of data using a large number of computer processing cycles. The capacity assessment computing system 130 can include a model training server 110 for building and training a machine learning model 120 to predict the capacity of a system or entity. The capacity assessment computing system 130 can further include a capacity assessment server 118 for performing a capacity assessment for given predictor variables 124 using the trained machine learning model 120.

The model training server 110 can include one or more processing devices that execute program code, such as a model training application 112. The program code is stored on a non-transitory computer-readable medium. The model training application 112 can execute one or more processes to train and optimize a machine learning model for predicting capacity of an entity based on predictor variables 124 associated with the entity.

In some aspects, the model training application 112 can build and train a machine learning model 120 utilizing model training samples 126. The model training samples 126 can include multiple training samples consisting of training predictor variables, task quantities, and training performance indicators corresponding to the training predictor variables and the task quantities. The training predictor variables can include various variables associated with entities that can be used to estimate the capacity of the entity; the task quantities are the quantities of tasks assigned to respective entities; and the training performance indicators indicate the performance outcomes corresponding to the predictor variables and the task quantities, such as whether there is any failure associated with an entity after the quantity of task is assigned to the entity. In some examples, the training performance indicator indicates the overall performance outcome of the entity, including, but not limited to, the performance outcome on the assigned task and other tasks. The model training samples 126 can be stored in one or more network-attached storage units on which various repositories, databases, or other structures are stored. Examples of these data structures are the capacity data repository 122.

Network-attached storage units may store a variety of different types of data organized in a variety of different ways and from a variety of different sources. For example, the network-attached storage unit may include storage other than primary storage located within the model training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

The capacity assessment server 118 can include one or more processing devices that execute program code, such as a capacity assessment application 114. The program code is stored on a non-transitory computer-readable medium. The capacity assessment application 114 can execute one or more processes to utilize the machine learning model 120 trained by the model training application 112 to predict capacity of an entity based on input predictor variables 124. In addition, if the machine learning model is configured and trained to be explainable, the machine learning model 120 can also be utilized to generate explanation codes for the predictor variables, which indicate an effect or an amount of impact that one or more predictor variables have on the model output.

Furthermore, the capacity assessment computing system 130 can communicate with various other computing systems, such as tasking systems 104. A tasking system 104 may be a system configured to assign or submit tasks to a target system 106 which may be a computing system associated with a target entity. For example, the tasking systems 104 may send capacity assessment queries to the capacity assessment server 118 for capacity assessment, or may send signals to the capacity assessment server 118 that control or otherwise influence different aspects of the capacity assessment computing system 130. The tasking systems 104 may also interact with the target systems 106 via one or more public data networks 108 to facilitate interactions such as task assignment or submission to the target systems 106.

For example, a target system 106 may be a server or a server cluster including multiple servers configured to provide computing services to tasking systems 104. The tasking system 104 in this example can be a client computing device that has computing tasks to be executed. If the tasking system 104 determines, by querying the capacity assessment server 118, that a target system 104 has a sufficient capacity for handling the computing tasks, the tasking system 104 can submit the computing tasks to the target system 106; otherwise, the tasking system 104 will not send the computing tasks to the target system 106.

In another example, the target system 106 may be a super node in a mesh network and the tasking system 104 may be a regular node. The super node can be configured with more computing power than regular nodes and thus can provide computing services to the regular nodes. When the tasking system 104 (i.e., a regular node) has computing tasks to be executed but cannot process them itself, the tasking system 104 can query the capacity assessment server 118 (which may be a personal area network coordinator in this example) to determine the capacity of the target system 106. If the capacity assessment server 118 determines that the target system 104 has a sufficient capacity for handling the computing tasks or at least a portion thereof, the tasking system 104 can transmit the computing tasks to the target system 106; otherwise, the tasking system 104 will not send the computing tasks to the target system 106.

In a further example, the machine learning model may be configured to estimate the repayment capacity of a consumer. In this example, the tasking system 104 may be a bank or another type of financial institution, and the target system 106 may be a computing system associated with a consumer (the target entity) who has applied a loan from the bank or financial institution. The tasking system 104 may need to determine the repayment capacity of the consumer in order to determine the monthly repayment amount for the loan. To do so, the tasking system 104 can query the capacity assessment server 118 to determine the repayment capacity of the consumer associated with the target system 106. Based on the determined repayment capacity by the capacity assessment server 118, the tasking system 104 can determine the proper contractual repayment amount for the consumer and send the repayment amount to the consumer, such as through the target system 106 associated with the consumer.

Each tasking system 104 may include one or more third-party devices, such as individual servers or groups of servers operating in a distributed manner. A tasking system 104 can include any computing device or group of computing devices operated by a seller, lender, or other providers of products or services. The tasking systems 104 can include one or more server devices. The one or more server devices can include or can otherwise access one or more non-transitory computer-readable media.

A target system 106 can include any computing device or other communication device operated by an entity, such as an individual (a consumer or a customer) or an organization/company. The target system 106 can include one or more computing devices, such as servers, laptops, smartphones, and other personal computing devices. A target system 106 can include executable instructions stored in one or more non-transitory computer-readable media. The target system 106 can also include one or more processing devices that are capable of executing program code to perform operations described herein, such as processing the submitted tasks or performing repayment for a loan, a mortgage or a credit card.

In a simplified example, the system depicted in FIG. 1 can configure a machine learning model to be used for accurately determining capacity of a target entity or a target system, such as task processing capacity or repayment capacity, using predictor variables associated with the target entity. A predictor variable can be any variable predictive of the capacity of an entity. Any suitable predictor variable that is authorized for use by an appropriate legal or regulatory framework may be used.

Examples of predictor variables used for predicting the computing capacity of a target system such as a server or a server cluster or a super node include, but are not limited to, variables indicating the hardware configuration of the target system (e.g., the CPU configuration of the target system, the memory size and speed of the target system, the network connection speed of the target system), variables indicating the software configuration of the target system (e.g., the version of the operating system of the target system), variables indicative of prior tasks assigned to the target system (e.g., past task assignments), variables indicative of one or more performance traits of the target system (e.g., the time used to complete a task assignment, past failure rate), etc. Similarly, examples of predictor variables used for predicting the repayment associated with an entity (e.g., a consumer or an organization) accessing services provided by a financial institute such as loans, mortgage, or credit cards include, but are not limited to, variables indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the model training server 110 and the capacity assessment server 118, may be instead implemented in a signal device or system.

Examples of Operations Involving Machine-Learning

Figure 2:
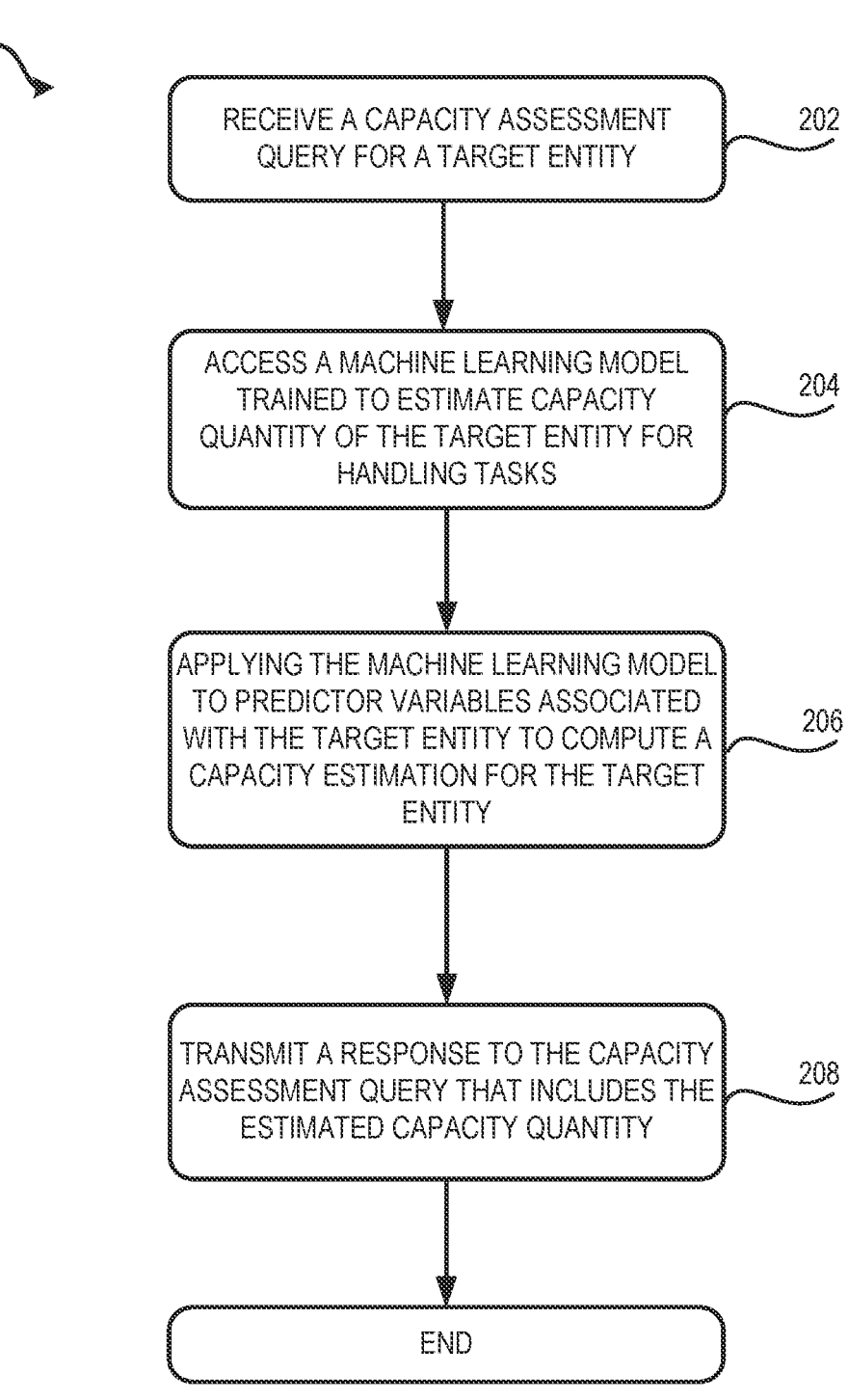
FIG. 2 is a flow chart depicting an example of a process for utilizing a machine learning model to generate a prediction for an unobservable capacity of a target system or entity based on predictor variables associated with the target system or entity, according to certain aspects of the present disclosure.

FIG. 2 is a flow chart depicting an example of a process 200 for utilizing a machine learning model to generate a prediction for an unobservable capacity of a target entity or system based on predictor variables associated with the target entity or system. One or more computing devices (e.g., the capacity assessment server 118) implement operations depicted in FIG. 2 by executing suitable program code (e.g., the capacity assessment application 114). For illustrative purposes, the process 200 is described with reference to certain examples depicted in the figures. Other implementations, however, are possible.

At block 202, the process 200 involves receiving a capacity assessment query for a target entity from a remote computing device, such as a tasking system 104. The capacity assessment query can also be received by the capacity assessment server 118 from another remote computing device associated with an entity authorized to request capacity assessment of the target entity. The capacity assessment query may include an identifier of the target entity that can uniquely identify the target entity. The capacity assessment query may further include other information associated with the target entity, such as information that can be used to generate the predictor variables of the target entity or at least a portion thereof.

At operation 204, the process 200 involves accessing a machine learning model trained to generate capacity estimation based on input predictor variables or other data suitable for assessing capacity of an entity. As discussed above, in the computing examples, the predictor variables can include variables indicating the hardware configuration of the target system (e.g., the CPU configuration of the target system, the memory size and speed of the target system, the network connection speed of the target system), variables indicating the software configuration of the target system (e.g., the version of the operating system of the target system), variables indicative of prior tasks assigned to the target system (e.g., past task assignments), variables indicative of one or more performance traits of the target system (e.g., the time used to complete a task assignment), etc. The capacity can indicate the capacity of the target entity for handling task execution.

In the financial examples, the predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, predictor variables can be obtained from credit files, financial records, consumer records, etc. The capacity can indicate the repayment capacity of the entity for a financial product applied by the entity.

The machine learning model can be constructed and trained based on training samples including training predictor variables, training performance indicators, and task quantities. The training predictor variables can include various variables associated with entities that can be used to estimate the capacity of the entity; the task quantity is the quantity of task assigned to the target entity; and the training performance indicator indicates the performance outcome corresponding to the predictor variables and the task quantity, such as whether there is any failure associated with the entity after the quantity of task is assigned to the entity. In some examples, the training performance indicator indicates the overall performance outcome of the entity, including the performance outcome on the assigned task and other tasks. Additional details regarding training the machine learning model will be presented below with regard to FIGS. 3-5.

At operation 206, the process 200 involves applying the machine learning model to the predictor variables associated with the target entity. The predictor variables associated with the target entity can be obtained from a predictor variable database configured to store predictor variables associated with various entities, such as the capacity data repository 122. Additionally, or alternatively, the predictor variables may be generated based on the information included in the capacity assessment query or referenced by the capacity assessment query (e.g., via a link to a third-party data store). The output of the machine learning model would include the estimated capacity quantity for the target entity based on its current predictor variables.

At operation 208, the process 200 involves generating and transmitting a response to the capacity assessment query that includes the estimated capacity generated using the machine learning model. The estimated capacity can be used by the tasking system 104 to perform one or more operations that involve the target entity. In one example, the estimated capacity can be utilized to determine the quantity of the task assigned to the target entity.

Figure 3:
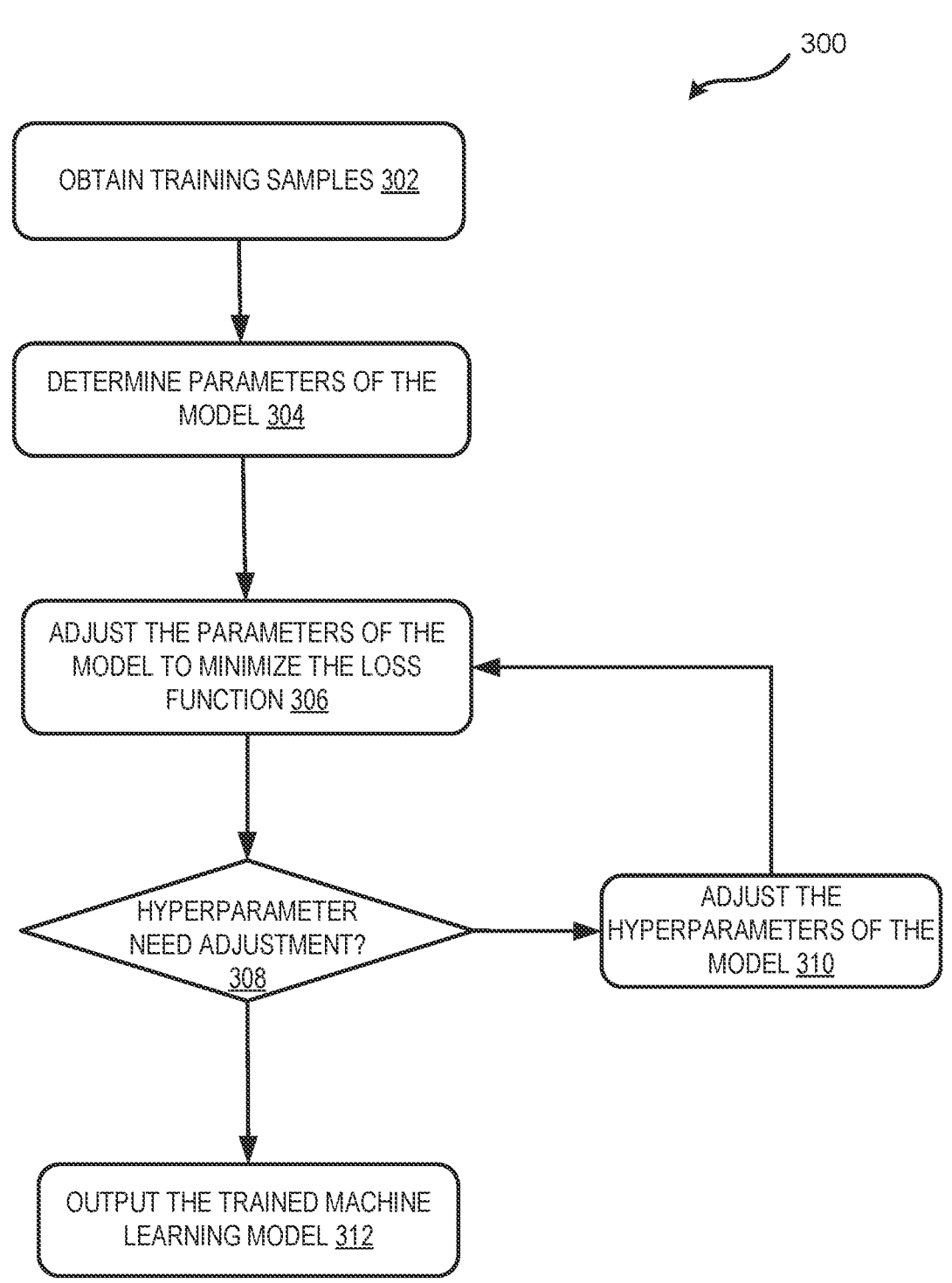
FIG. 3 is a flow chart depicting an example of a process for training a machine learning model to generate a prediction for an unobservable capacity of a target system or entity, according to certain aspects of the present disclosure.

Referring now to FIG. 3, a flow chart depicting an example of a process 300 for training a machine learning model to generate a prediction for an unobservable capacity of a target entity is presented. FIG. 3 will be presented in conjunction with FIGS. 4 and 5 where respective examples of a loss function for a machine learning model configured to predict an unobservable capacity of a target entity are presented. One or more computing devices (e.g., the model training server 110) implement operations depicted in FIG. 3 by executing suitable program code (e.g., the model training application 112). For illustrative purposes, the process 300 is described with reference to certain examples depicted in the figures. Other implementations, however, are possible.

At block 302, the process 300 involves the model training server 110 obtaining training samples for the machine learning model. The training samples can include multiple training vectors consisting of training predictor variables X, training performance indicators G, and task quantities C. The i-th training vector can include an n-dimensional input predictor vector $$X^{(i)} = \left[ X_1^{(i)}, \ldots, X_n^{(i)} \right]$$

constituting particular values of the training predictor variables for entity i, where $i=1, \ldots, N_u$ and $N_u$ is the number of entities in the training samples. The i-th training vector can also include a task quantity $C^{(i)}$ indicating the quantity of task assigned to entity i that corresponds to the input predictor vector $X^{(i)}$. The i-th training vector can further include a training performance indicator $G^{(i)}$ indicating the performance outcome corresponding to the input predictor vector $X^{(i)}$ and the task quantity $C^{(i)}$, such as whether there is any failure associated with the entity after the quantity of task is assigned to the entity.

The training samples can be generated based on a dataset containing various variables, performance indicators and task quantities associated with different entities including individuals. In some examples, the training samples are generated to only include predictor variables X that are appropriate and allowable for predicting the capacity. These appropriate and allowable predictor variables can be selected based on regulatory requirements, business requirements, contractual requirements, or any combination thereof. In some scenarios, values of some predictor variables may be missing in the dataset. These missing values can be handled by substituting these values with values that logically are acceptable, filling these values with values received from a user interface, or both. In other examples, the data records with missing values are removed from the training samples.

At block 304, the process 300 involves the model training server 110 determining the parameters of the machine learning model. The parameters of the machine learning model include architectural parameters of the machine learning model. For example, for a neural network model, the architectural parameters can include the number of layers in the neural network, the number of nodes in each layer, the activation functions for each node, or some combination thereof. For instance, the dimension of the input variables can be utilized to determine the number of nodes in the input layer. For an input predictor vector having n input variables, the input layer of the neural network can be constructed to have n nodes, corresponding to the n input variables, and a constant node. Likewise, the number of outputs in a training sample can be utilized to determine the number of nodes in the output layer, that is, one node in the output layer corresponds to one output. As the output of the neural network here is the value of the capacity, the output layer can be set to include one node. Other aspects of the neural network, such as the number of hidden layers, the number of nodes in each hidden layer, and the activation function at each node can be determined based on various factors such as the complexity of the prediction problem, available computation resources, accuracy requirement, and so on. In some examples, some of the architectural parameters, such as the number of nodes in each hidden layer can be randomly selected. The parameters of the machine learning model can also include parameters that are learned by fitting the training data to the model, such as the weights of connections between nodes in a neural network model. Some parameters are not altered in the process of minimizing a loss function, such as the number of nodes in each layer of the neural network, whereas parameters such as the weights of connections between nodes are modified when minimizing the loss function. The former is referred to as hyperparameters.

For example, a neural network model can include an input layer having a bias node and n nodes each corresponding to a training predictor variable in the (n+1)-dimension input predictor vector $X=[1, X_1, \ldots, X_n]$. The neural network can further include a first hidden layer having M nodes and a bias node, a second hidden layer having K nodes and a bias node, and an output layer for a single output $\hat{y}$, i.e., the estimated value of the capacity. The weights of the connections from the input layer to the first hidden layer can be denoted as $$w_{ij}^{(1)},$$

where $i=0, \ldots, n$ and $j=1, \ldots, M$, $$w_{0j}^{(1)}$$

are bias weights and others are non-bias weights. Similarly, the weights of the connections from the first hidden layer to the second hidden layer can be denoted as $$w_{ik}^{(2)},$$

where $j=0, \ldots, M$ and $k=1, \ldots, K$, $$w_{0k}^{(2)}$$

are bias weights and others are non-bias weights. The weights of the connections from the second hidden layer to the output layer can be denoted as $\delta_k$, where $k=1, \ldots, K$.

The weights of the connections between layers can be utilized to determine the inputs to a current layer based on the output of the previous layer. For example, the input to the $j^{th}$ node in the first hidden layer can be determined as $$\sum_{i=0}^{n} w_{ij}^{(1)} X_i,$$

where $X_i$, $i=0, \ldots n$, are the predictor variables in the bias and input predictor vector X, and $j=1, \ldots, M$. Similarly, the input to the $k^{th}$ node in the second hidden layer can be determined as $$\sum_{i=0}^{M} w_{ik}^{(2)} H_j^{(1)},$$

where $$H_j^{(1)},$$

$j=0, \ldots M$, are the bias and outputs of the nodes in the first hidden layer and $k=1, \ldots, K$. The input to the output layer of the neural network can be determined as $$\sum_{k=0}^{K} \delta_k H_k^{(2)},$$

where $$H_k^{(2)}$$

are the bias and the output of the $k^{th}$ node at the second hidden layer.

The output of a hidden layer node or an output layer node can be determined by an activation function implemented at that particular node. In some aspects, the output of each of the hidden nodes can be modeled as a logistic function of the input to that hidden node and the output $\hat{y}$ can be modeled as a function $g(\cdot)$ of the outputs of the nodes in the last hidden layer, such as a linear function $g(x)=x$, a softplus function $g(x)=\ln(1+\exp(x))$ or an exponential function. Specifically, the neural network nodes in the neural network can employ the following activation functions:

$$H_j^{(1)} = \frac{1}{1+\exp\left(-Xw_{\cdot j}^{(1)}\right)}, \tag{1}$$

where $X = [1, X_1, \ldots, X_n]$, $w_{\cdot j}^{(1)} = \left[w_{0j}^{(1)}, w_{1j}^{(1)}, \ldots, w_{nj}^{(1)}\right]^T$;

$$H_k^{(2)} = \frac{1}{1+\exp\left(-H^{(1)}w_{\cdot k}^{(2)}\right)}, \tag{2}$$

where $H^{(1)} = \left[1, H_1^{(1)}, \ldots, H_M^{(1)}\right]$, $w_k^{(2)} = \left[w_{0k}^{(2)}, w_{1k}^{(2)}, \ldots, w_{Mk}^{(2)}\right]^T$; and $$\hat{y} = g\left(H^{(2)}\delta\right), \tag{3}$$

where $H^{(2)} = \left[1, H_1^{(2)}, \ldots, H_K^{(2)}\right]$, $\delta = [\delta_0, \delta_1, \delta_2, \ldots, \delta_K]^T$.

For illustrative purposes, the neural network described in the above example includes two hidden layers and a single output. But neural networks with any number of hidden layers and any number of outputs can be formulated in a similar way. Further, in addition to the logistic function presented above, the neural network can have any differentiable activation function that accepts real number inputs and outputs a real number. Examples of activation functions include, but are not limited to, exponential function, softplus function, and linear function, the logistic, arc-tangent, and hyperbolic tangent functions. In addition, different layers of the neural network can employ the same or different activation functions.

At block 306, the process 300 involves the model training server 110 adjusting the parameters of the machine learning model to minimize a loss function of the model. For example, training the machine learning model can be considered as learning a function $f(X)$ of the predictor variables X, where $f(X^{(i)})$ can be interpreted as the remaining capacity for entity i. In examples wherein the capacity is the monthly repayment capacity, $f(X^{(i)}$ can be interpreted as the remaining monthly repayment capacity for entity i. That is, the maximum amount that entity i can afford to take on without suffering financial stress.

While an entity's repayment capacity is not observable, the following information can be observed in historic data: new loans taken out by entities with contractual repayment amounts and subsequent entity level outcomes that may be classified as "good" or "bad." For example, if after an entity took out a new loan with a certain contractual monthly repayment amount, the entity successfully paid the repayment amounts on all his or her credit accounts including the new loan, the entity level outcome can be classified as "good." If the entity fails to pay the repayment amount on at least one of his or her credit accounts, the entity level outcome may be classified as "bad." The contractual repayment amount can be used as the task quantity $C^{(i)}$ and the entity level outcome can be used as the performance indicator $G^{(i)}$ in the training data.

As such, in the above example, $C^{(i)}$ denotes the actual contractual repayment amount on a new loan taken out by entity i, $G^{(i)}$ denotes the entity level outcome with value 1 being "good" and value 0 being "bad." Let $\hat{y}_i = f(X^{(i)})$ denote the model output and $y_i$ denote the true, unobserved repayment capacity. Then $G^{(i)}$ is the value of the indicator function $G^{(i)} = I(C^{(i)} \leq y_i)$. Two types of mistakes made by the model can be identified and penalized:

1. If $G^{(i)} = 1$ and $\hat{y}_i < C^{(i)}$ then the model underestimates $y_i$ by at least the deficit amount $(C^{(i)} - \hat{y}_i)$. A loss of the form $\alpha_G G^{(i)} \max(0, C^{(i)} - \hat{y}_i)$ can thus be added.
2. If $G^{(i)} = 0$ and $\hat{y}_i > C^{(i)}$ then the model overestimates $y_i$ by at least the excess amount $(\hat{y}_i - C^{(i)})$. A loss of the form $\alpha_B (1 - G^{(i)}) \max(0, \hat{y}_i - C^{(i)})$ can thus be added.

Figure 4:
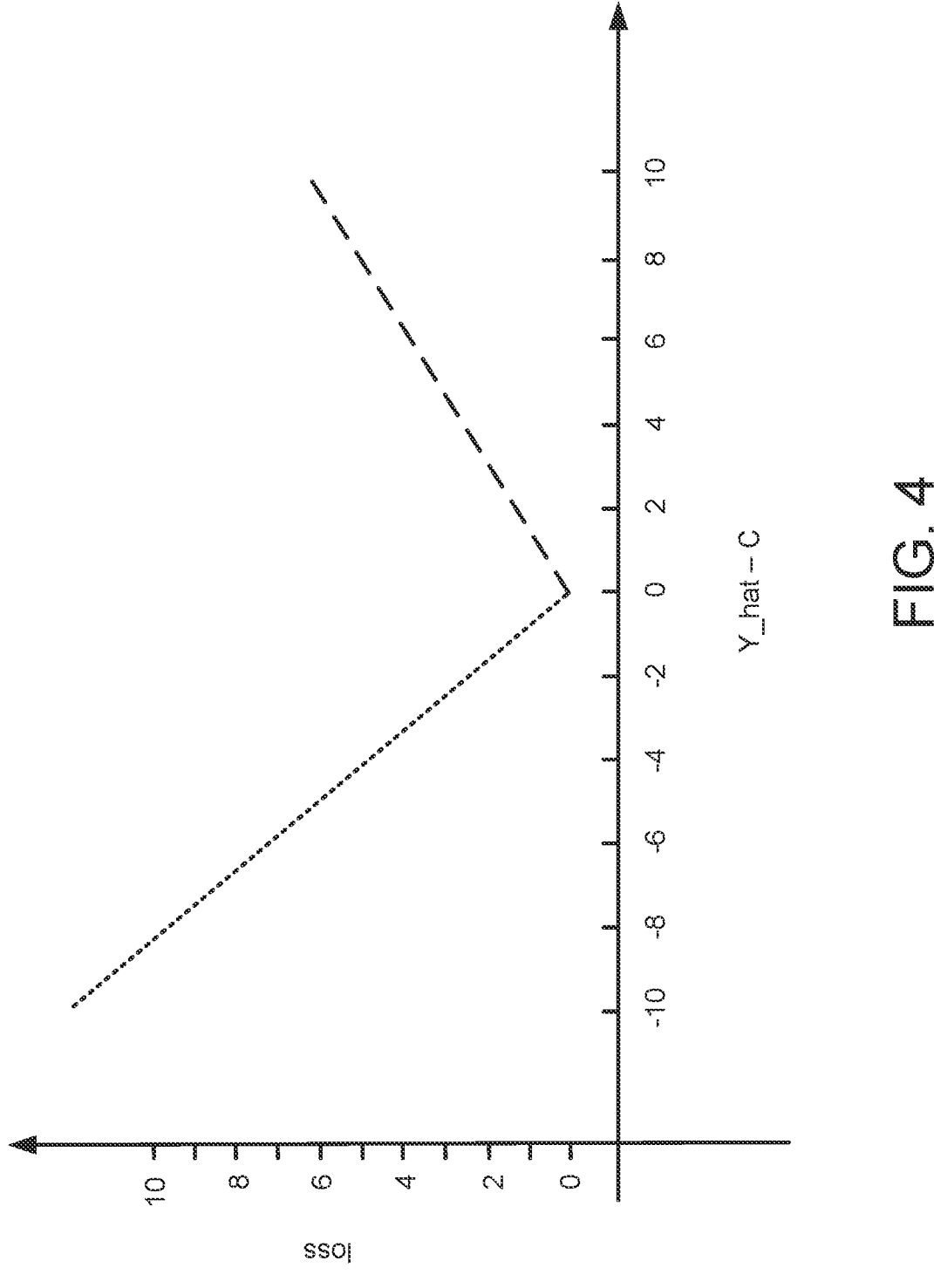
FIG. 4 is a diagram depicting an example of a loss function for a machine learning model configured to predict an unobservable capacity of a target system or entity, according to certain aspects of the present disclosure.

The resulting loss function for entity i becomes:

$$L(\hat{y}_i, C^{(i)}, G^{(i)}) = \alpha_G G^{(i)} \max(0, C^{(i)} - \hat{y}_i) + \alpha_B(1 - G^{(i)})\max(0, \hat{y}_i - C^{(i)}), \quad (4)$$

where $\alpha_G$ and $\alpha_B$ are weights allocated to the deficit amount and the excess amount, respectively. Note that if and by how much the model overestimates $y_i$ for a good outcome, or underestimates $y_i$ for a bad outcome cannot be identified. Rather the balancing effect of both good and bad cases are relied upon in the data to optimize the model for any $X^{(i)}$. FIG. 4 shows an example of the loss function $L(\hat{y}_i, C^{(i)}, G^{(i)})$.

In Equation (4), $\alpha_G$ and $\alpha_B$ specify a relative penalty assigned to the deficit amount of capacity estimation and the excess amount of capacity estimation. Establishing an appropriate relative penalty on the loss function can be important. Since most training datasets will have a bad rate much lower than 50%, if $\alpha_G$ and $\alpha_B$ are set equal, the model will be dominated by the effect of good outcomes, leading to high estimates of $y_i$. To produce more conservative capacity estimates, $\alpha_B$ can be increased. In some examples, $\alpha_G$ and $\alpha_B$ can be set according to an entity level bad rate of $\tau$. If an entity level bad rate of $\tau$ is acceptable, $\alpha_G$ and $\alpha_B$ can be set such that $$\frac{\alpha_G}{\alpha_B + \alpha_G} = \tau$$

as a starting point for tuning although the bad rate $\tau$ is not guaranteed.

The overall loss function for the machine learning model becomes:

$$L = \sum_{i=1}^{N_u} \beta_i L(\hat{y}_i, C^{(i)}, G^{(i)}), \quad (5)$$

where $\beta_i$ is a weight assigned to the loss function for entity i (e.g., based on the training samples) and $N_u$ is the total number of entities. As shown in FIG. 4, the loss function is differentiable except at the point $\hat{y}_i = C^{(i)}$. By treating the derivative at the point $\hat{y}_i = C^{(i)}$ as zero, any gradient descent algorithm can be implemented to optimize a parametric model, such as a neural network, using this loss. In addition, any tree-based model algorithm that admits a custom loss function such as a gradient boosting machine (GBM) model can be used.

Figure 5:
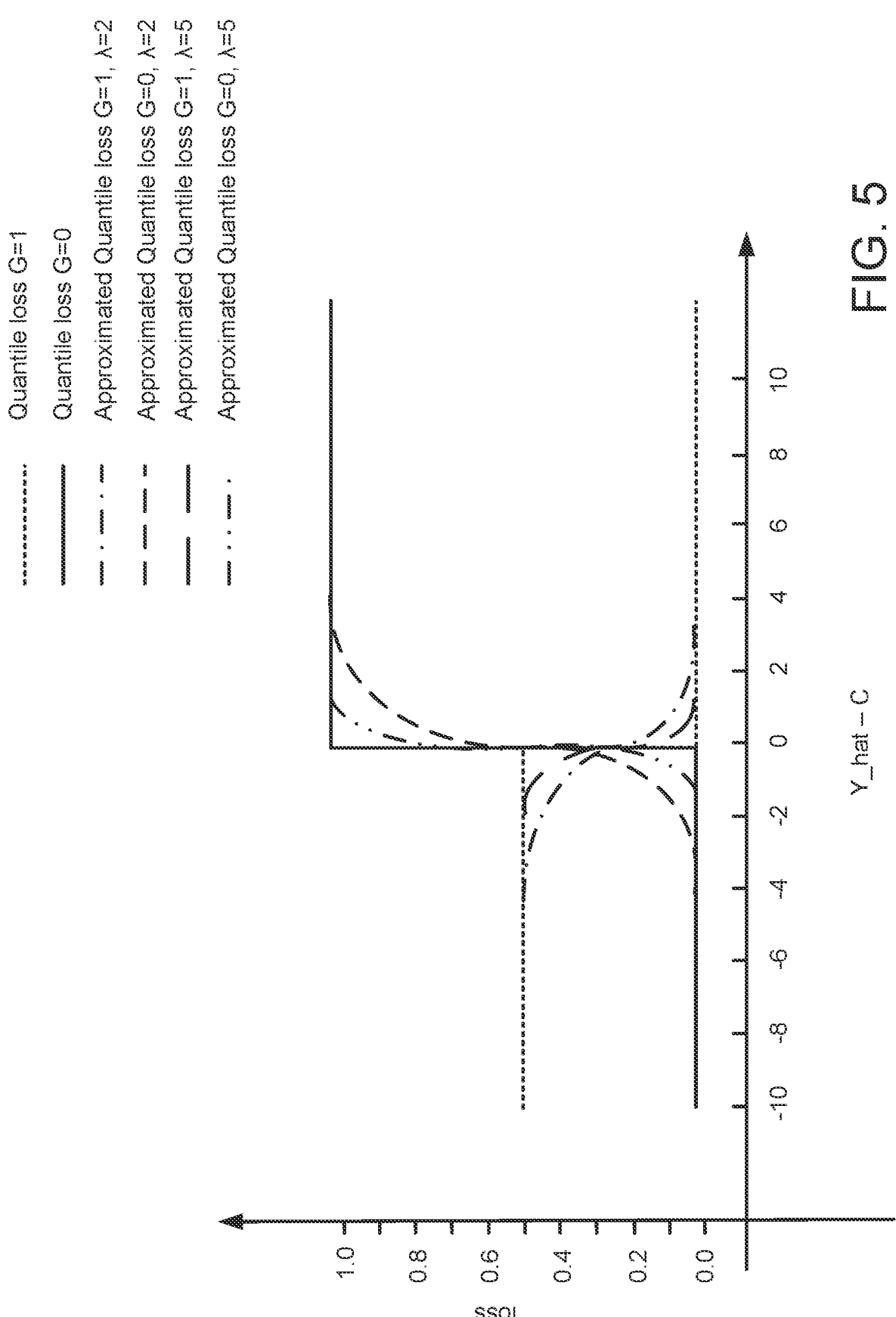
FIG. 5 is a diagram depicting another example of a loss function for a machine learning model configured to predict an unobservable capacity of a target system or entity, according to certain aspects of the present disclosure.

In another example, the loss function for entity i can also be formulated as a case 1 interval censored quantile regression loss:

$$L_q(\hat{y}_i, C^{(i)}, G^{(i)}) = \tau G^{(i)} I(C^{(i)} \geq \hat{y}_i) + (1 - \tau)(1 - G^{(i)}) I(C^{(i)} \leq \hat{y}_i), \quad (6)$$

where $\tau$ is an entity level bad rate and measures the relative importance of the deficit term $G^{(i)} I(C^{(i)} \geq \hat{y}_i)$ and the excess term $(1 - G^{(i)}) I(C^{(i)} \leq \hat{y}_i)$. However, this function has a discontinuity at $C^{(i)} = \hat{y}_i$ and zero gradient at other points, which hinders optimization. To solve this problem, in a gradient descent context, a sigmoid approximation of the form $I(x \geq 0) \sim 1/(1 + \exp(-\lambda x))$ could be used. The hyperparameter $\lambda$ can be progressively increased as model training progresses, to generate closer approximations to the step function. These loss functions are illustrated in FIG. 5 for $\tau = 0.25$. With the sigmoid approximation, the loss function for entity i becomes the quantile loss:

$$L_q(\hat{y}_i, C^{(i)}, G^{(i)}) \approx \frac{\tau G^{(i)}}{1 + \exp(-\lambda(C^{(i)} - \hat{y}_i))} + \frac{(1 - \tau)(1 - G^{(i)})}{1 + \exp(-\lambda(\hat{y}_i - C^{(i)}))}. \quad (7)$$

The overall loss function becomes:

$$L = \sum_{i=1}^{N_u} \beta_i L_q(\hat{y}_i, C^{(i)}, G^{(i)}). \quad (8)$$

With the loss function, the model training server 110 can train the model by minimizing the loss function L. The minimization can include iterative adjustments of the parameters of the machine learning model so that the value of the loss function L in a current iteration is smaller than the value of the loss function in an earlier iteration. The iteration of these adjustments can terminate based on one or more conditions no longer being satisfied. For example, the iteration adjustments can stop if the decrease in the values of the loss function in two adjacent iterations is no more than a threshold value. Other ways of solving the minimization problem of the loss function in Equation (5) or Equation (8) can also be utilized.

In some examples, the machine learning model is trained to be an explainable model where the relationship between each predictor variable and the output of the model can be traced. For example, the machine learning may be a monotonic neural network such that an increase (or decrease) of an input predictor variable always causes an increase or decrease of the output of the model. To achieve the explainability of the machine learning model, the training may further involve adding constraints to enforce the explainability of the model when minimizing the loss function in Equation (5) or Equation (8).

As discussed above, in some examples, the hyperparameter of the machine learning model needs to be adjusted during the training. For instance, if the loss function in Equation (8) is utilized for training, the hyperparameter $\lambda$ can be progressively increased during the training to generate closer approximations to the step function. In those examples, the process 300 involves, at block 308, the model training server 110 determining whether a hyperparameter need to be adjusted. For example, a list of candidate values for the hyperparameter $\lambda$ can be provided and each value on the list should be examined during the training. Additionally, or alternatively, the loss function decrease for the past two consecutive values of the hyper parameter can be compared with a threshold. If the decrease is below a threshold value, the hyperparameter needs to be increased. If it is determined that the hyperparameter needs to be adjusted, the model training server 110 can adjust, at block 310, the hyperparameter, such as by taking the next value on the candidate list. Using the adjusted hyperparameter, the model training server 110 can resume the training process at block 306 based on the parameters determined in the last iteration. If, at block 308, it is determined that no adjustments need to be made to the hyperparameter, the process 300 involves the model training server 110 outputting the trained machine learning model at block 312.

While the above description focuses on the repayment capacity, the same techniques can be used to train a machine learning model for predicting other types of unobservable capacities. For example, for a machine learning model configured to predict the capacity of a target system for handling computing tasks, the predictor variables $X^{(i)}$ can be selected as discussed above with respect to FIG. 1, $C^{(i)}$ can be the quantity of the task submitted to the target system i, $G^{(i)}$ denotes the system level outcome with value 1 being good (i.e., no failure in the system) and value 0 being bad (i.e., there is a failure in the system) after the $C^{(i)}$ tasks are submitted. $\hat{y}_i = f(X^{(i)})$ is the model output and $y_i$ denote the true, unobserved system capacity. The same loss function in Eqn. (5) or Equation (8) can be utilized and minimized to train the model according to process 300.

Experimental Results

Because the true value of the capacity is unobservable, it is not trivial to measure the performance of the machine learning model. In some examples, the relative performance of two types of machine learning models can be compared. Table 1 shows a comparison of the two models (a neural network model and a GBM model) on a training dataset for repayment capacity estimation. For analysis purposes, observations are split into two cases:

"Lend more" or "below capacity"—the borrower's actual monthly repayment amount is lower than the model recommendation. Therefore, the model suggests lending more to this borrower.

"Lend less" or "above capacity"—the borrower's actual monthly repayment amount is higher than the model recommendation. Therefore, the model suggests lending less to this borrower.

The cells in the table show the number of observations, bad rate, and average charge off amount per bad observation. The latter is calculated only for those bad observations that have a populated loss per bad. It does not take into account borrowers who were classed as bad due to performance on another task. As such, it should be treated only as an indicative measure.

TABLE 1

| | | Neural network model | | |
| --- | --- | --- | --- | --- |
| | | Send less | Lend more | Overall |
| GBM model | Lend less | 46,202 | 3,323 | 49,525 |
| | | 24.5% | 13.3% | 23.7% |
| | | $350 | $166 | $342 |
| | Lend more | 3,716 | 69,308 | 73,024 |
| | | 13.3% | 4.4% | 4.8% |
| | | $221 | $172 | $177 |
| | Overall | 49,918 | 72,631 | 122,549 |
| | | 23.7% | 4.8% | 12.5% |
| | | $348 | $170 | $322 |

The models show very similar performance, with bad rates of 23.7% for 'lend less' and 4.8% for 'lend more' observations, versus an overall bad rate of 12.5%. 94% of observations lie on the diagonal where both models make the same recommendation.

Table 2 compares the recommendations of the machine learning model to a rule-based calculation, such as a debt-to-income (DTI) approach, an approach that allows grading of cases from "within capacity" to "over capacity," or an approach that groups cases into bands of task quantity versus predicted capacity. The DTI is calculated after the new loan using the model income attribute. Similar to Table 1, the cells in Table 2 show the number of observations, bad rate, and average charge off amount per bad observation. As shown in Table 2, within each 10% band of DTI, bad rates are significantly lower when the machine learning model recommendation is to lend more. In fact, even those whose estimated DTI exceeds 100%, where the model recommends lending more, have a lower bad rate than any of the bands where the model recommends to lend less.

TABLE 2

| | | DTI After Actual Loan | | | | | | |
| --- | --- | --- | --- | --- | --- | --- | --- | --- |
| | | 0-10% | 10-20% | 20-30% | 30-40% | 40-50% | 50-60% | 60-70% |
| ML model | Lend less | 5 | 1,581 | 5,376 | 7,763 | 8,749 | 8,177 | 6,509 |
| | | 20.0% | 22.6% | 23.1% | 23.8% | 22.5% | 21.4% | 22.4% |
| | | | $ 210 | $ 305 | $ 339 | $ 315 | $ 363 | $ 402 |
| | Lend more | 2,312 | 8,803 | 11,904 | 14,763 | 13,540 | 9,830 | 5,738 |
| | | 2.9% | 4.6% | 4.7% | 4.2% | 4.2% | 4.5% | 5.7% |
| | | $ 110 | $ 163 | $ 170 | $ 165 | $ 186 | $ 150 | $ 248 |
| | Overall | 2,317 | 10,384 | 17,280 | 22,526 | 22,289 | 18,007 | 12,247 |
| | | 2.9% | 7.4% | 10.5% | 11.0% | 11.4% | 12.2% | 14.6% |

TABLE 2-continued

| $110 | $192 | $270 | $311 | $301 | $339 | $392 |
|---|---|---|---|---|---|---|

| | | DTI After Actual Loan | | | | |
|---|---|---|---|---|---|---|
| | | 70-80% | 80-90% | 90-100% | 100%+ | Overall |
| ML model | Lend less | 4,567 | 2,773 | 1,712 | 2,706 | 49,918 |
| | | 23.2% | 24.3% | 28.2% | 35.8% | 23.7% |
| | | $ 437 | $ 361 | $ 475 | $ 387 | $ 348 |
| | Lend more | 2,927 | 1,294 | 599 | 921 | 72,631 |
| | | 7.3% | 9.4% | 9.3% | 10.2% | 4.8% |
| | | $ 170 | $ 306 | $ 402 | $ 107 | $ 170 |
| | Overall | 7,494 | 4,067 | 2,311 | 3,627 | 122,549 |
| | | 17.0% | 19.6% | 23.3% | 29.3% | 12.5% |
| | | $ 415 | $ 360 | $ 473 | $ 379 | $ 322 |

Example of Computing System for Machine-Learning Operations

Figure 6:
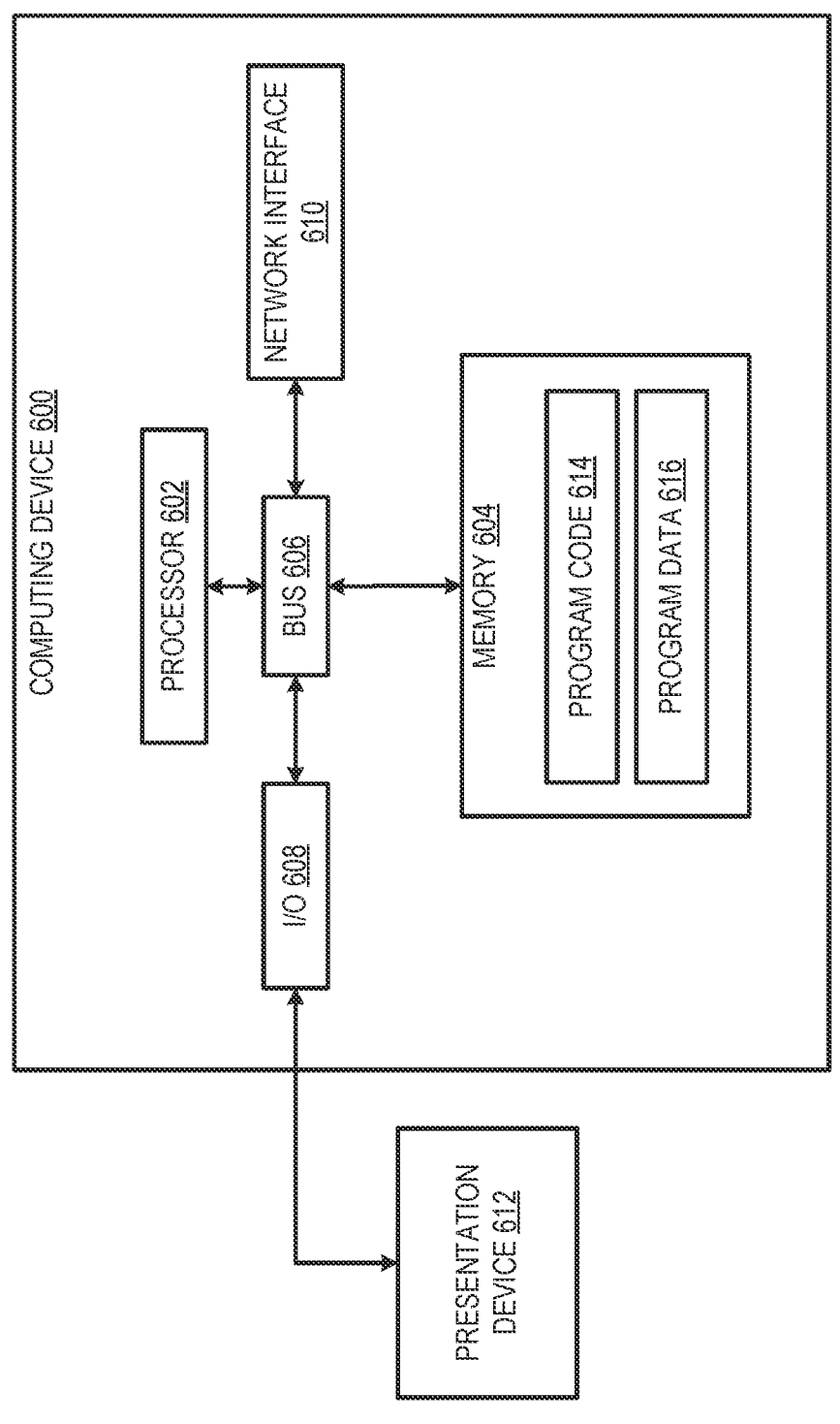
FIG. 6 is a block diagram depicting an example of a computing system suitable for implementing aspects of the techniques and technologies presented herein.

Any suitable computing system or group of computing systems can be used to perform the operations for the machine-learning operations described herein. For example, FIG. 6 is a block diagram depicting an example of a computing device 600, which can be used to implement the capacity assessment server 118 or the model training server 110. The computing device 600 can include various devices for communicating with other devices in the operating environment 100, as described with respect to FIG. 1. The computing device 600 can include various devices for performing one or more transformation operations described above with respect to FIGS. 1-5.

The computing device 600 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code 614 that includes the capacity assessment application 114 and/or the model training application 112. The program code 614 for the capacity assessment application 114 and/or the model training application 112 may be resident in any suitable computer-readable medium and may be executed on any suitable processing device. For example, as depicted in FIG. 6, the program code 614 for the capacity assessment application 114 and/or the model training application 112 can reside in the memory 604 at the computing device 600 along with the program data 616 associated with the program code 614, such as the predictor variables 124 and/or the model training samples 126. Executing the capacity assessment application 114 or the model training application 112 can configure the processor 602 to perform the operations described herein.

In some aspects, the computing device 600 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing device 600 using one or more data networks described herein. In other aspects, the presentation device 612 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A method that includes one or more processing devices performing operations comprising:

determining, using a machine learning model trained using a training process and from predictor variables associated with a target entity, a capacity of the target entity for handling tasks, wherein the training process includes operations comprising:

accessing training vectors having elements representing training predictor variables, training performance indicators, and task quantities, wherein a particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator; and performing adjustments of parameters of the machine learning model to minimize a loss function of the machine learning model, wherein the loss function is defined based on the training predictor variables, the training performance indicators, and the task quantities; and transmitting, to a remote computing device, a responsive message including at least the determined capacity for use in assigning tasks to the target entity with task quantities according to the determined capacity.

2. The method of claim 1, wherein the loss function comprises a first term based on a deficit amount of capacity estimation and a second term based on an excess amount of capacity estimation.

3. The method of claim 2, wherein the deficit amount and the excess amount are determined based on a difference between a model output generated by the machine learning model from the training predictor variables and the task quantity corresponding to the training predictor variables.

4. The method of claim 3, wherein the loss function is determined by a weighted combination of a first term measuring the deficit amount and a second term measuring the excess amount.

5. The method of claim 4, wherein weights of the first term of the loss function and the second term of the loss function are determined based on a failure rate.

6. The method of claim 3, wherein the loss function is determined by approximating a case 1 interval censored quantile regression loss function using a sigmoid function with a hyperparameter.

7. The method of claim 6, wherein the hyperparameter of the sigmoid function is progressively increased during the training process.

8. The method of claim 1, wherein the machine learning model comprises a neural network model or a gradient boosting machine (GBM) model.

9. A system comprising:

a processing device; and a memory device in which instructions executable by the processing device are stored for causing the processing device to:

determine, using a machine learning model trained using a training process and from predictor variables associated with a target entity, a capacity of the target entity for handling tasks, wherein the training process includes operations comprising:

accessing training vectors having elements representing training predictor variables, training performance indicators, and task quantities, wherein a particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator; and performing adjustments of parameters of the machine learning model to minimize a loss function of the machine learning model, wherein the loss function is defined based on the training predictor variables, the training performance indicators, and the task quantities; and transmit, to a remote computing device, a responsive message including at least the determined capacity for use in assigning tasks to the target entity with task quantities according to the determined capacity.

10. The system of claim 9, wherein the loss function comprises a first term based on a deficit amount of capacity estimation and a second term based on an excess amount of capacity estimation.

11. The system of claim 10, wherein the deficit amount and the excess amount are determined based on a difference between a model output generated by the machine learning model from the training predictor variables and the task quantity corresponding to the training predictor variables.

12. The system of claim 11, wherein the loss function is determined by a weighted combination of a first term measuring the deficit amount and a second term measuring the excess amount.

13. The system of claim 12, wherein weights of the first term of the loss function and the second term of the loss function are determined based on a failure rate.

14. The system of claim 11, wherein the loss function is determined by approximating a case 1 interval censored quantile regression loss function using a sigmoid function with a hyperparameter.

15. The system of claim 14, wherein the hyperparameter of the sigmoid function is progressively increased during the training process.

16. A non-transitory computer-readable storage medium having program code that is executable by a processor device to cause a computing device to perform operations, the operations comprising:

determining, using a machine learning model trained using a training process and from predictor variables associated with a target entity, a capacity of the target entity for handling tasks, wherein the training process includes operations comprising:

accessing training vectors having elements representing training predictor variables, training performance indicators, and task quantities, wherein a particular training vector comprises particular values for the training predictor variables, respectively, a particular training performance indicator indicating performance outcome corresponding to the particular values for the training predictor variables, and a task quantity associated with a task assigned to the target entity that leads to the particular training performance indicator; and performing adjustments of parameters of the machine learning model to minimize a loss function of the machine learning model, wherein the loss function is defined based on the training predictor variables, the training performance indicators, and the task quantities; and transmitting, to a remote computing device, a responsive message including at least the determined capacity for use in assigning tasks to the target entity with task quantities according to the determined capacity.

17. The non-transitory computer-readable storage medium of claim 16, wherein the loss function comprises a first term based on a deficit amount of capacity estimation and a second term based on an excess amount of capacity estimation.

18. The non-transitory computer-readable storage medium of claim 17, wherein the deficit amount and the excess amount are determined based on a difference between a model output generated by the machine learning model from the training predictor variables and the task quantity corresponding to the training predictor variables.

19. The non-transitory computer-readable storage medium of claim 18, wherein the loss function is determined by a weighted combination of a first term measuring the deficit amount and a second term measuring the excess amount.

20. The non-transitory computer-readable storage medium of claim 18, wherein the loss function is determined by approximating a case 1 interval censored quantile regression loss function using a sigmoid function with a hyper-parameter.

\* \* \* \* \*